Oct. 24, 1961    R. MARINDIN    3,005,499
TRACTOR CLUTCH DISENGAGING MEANS
Filed April 7, 1958    2 Sheets-Sheet 1
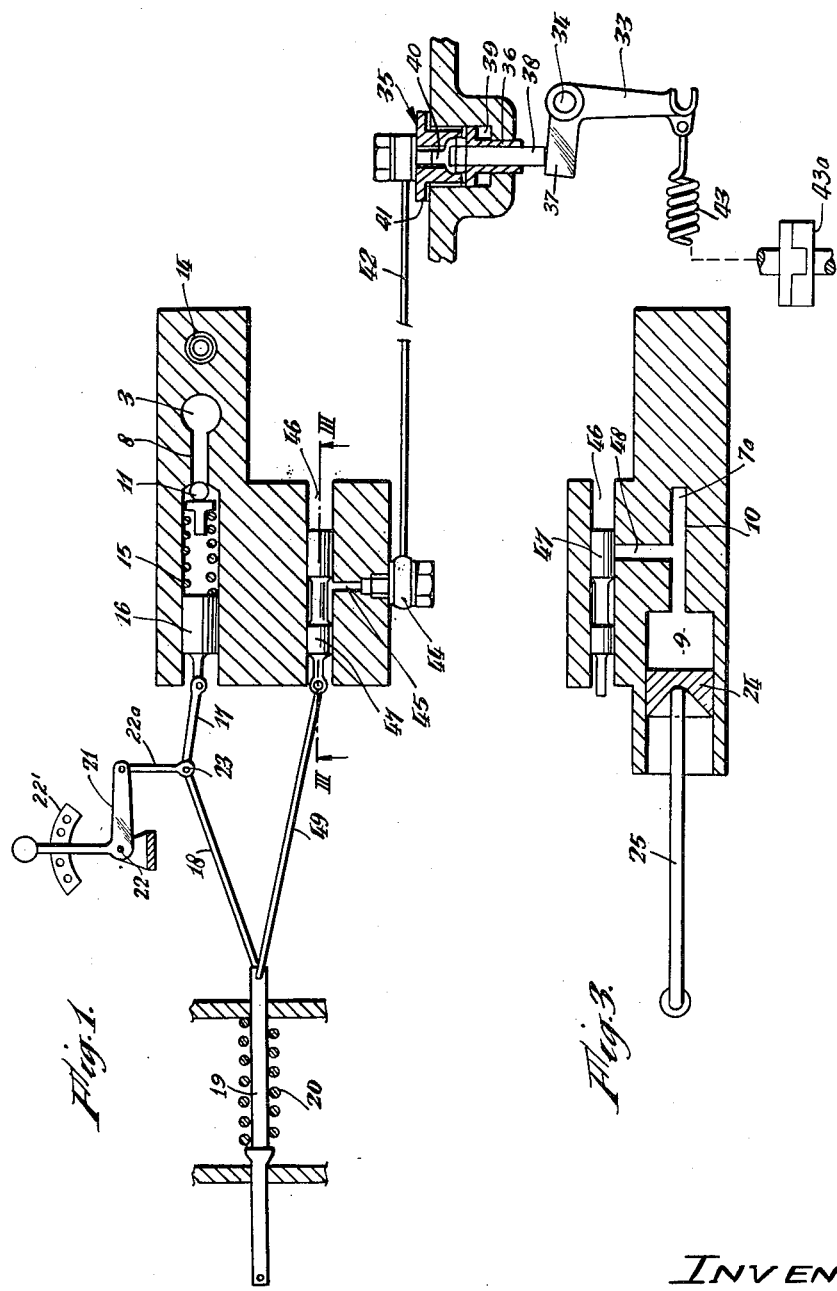
INVENTOR
ROBERT MARINDIN
Paul O Pippel
ATTORNEY

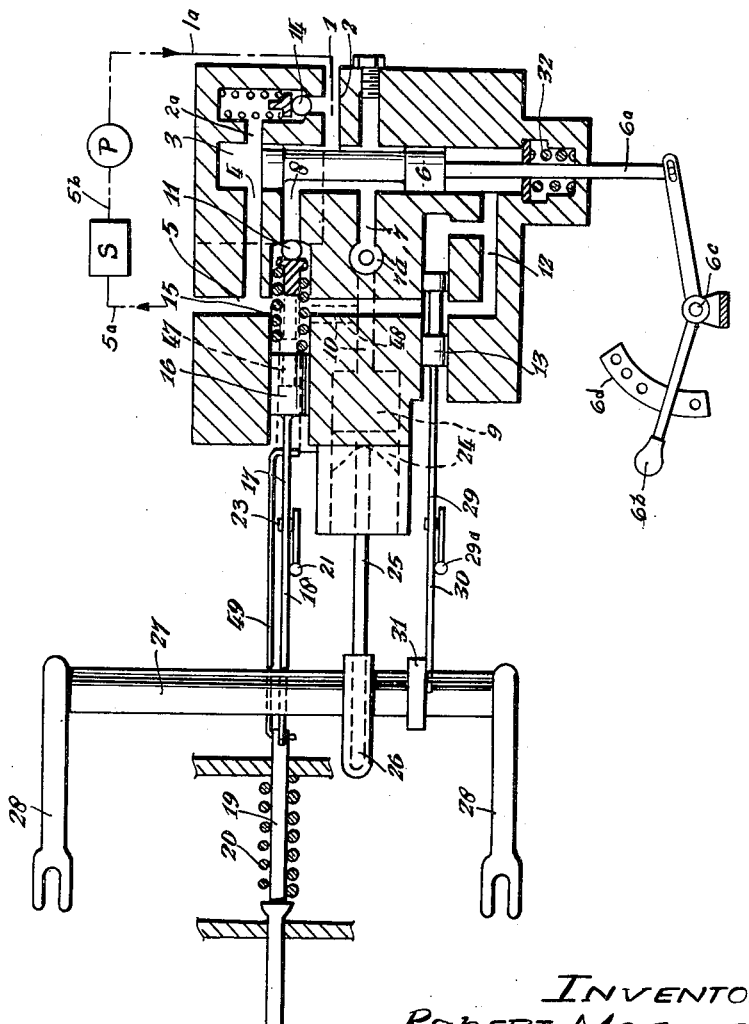

United States Patent Office 3,005,499
Patented Oct. 24, 1961

3,005,499
TRACTOR CLUTCH DISENGAGING MEANS
Robert Marindin, Sprotborough, Doncaster, England, assignor to International Harvester Company, Chicago, Ill., a corporation of New Jersey
Filed Apr. 7, 1958, Ser. No. 726,790
Claims priority, application Great Britain Apr. 8, 1957
7 Claims. (Cl. 172—3)

This invention relates to tractors of the kind having implement-attaching and control means, including a draft-responsive member and a hydraulic power lift operatively connected to an implement-attaching linkage, e.g. of the three-point linkage type, and controllable in such manner that load transfer in a tractor implement assembly may be obtained.

It is well-known that the tractive effort of a tractor, when used with ploughs and other agricultural implements imposing a substantial draft load, is limited by the incidence of slipping of the drive wheels of the tractor, particularly on soft ground, and that the tractive effort can be substantially increased within the limits of the available horse-power by increasing the loading on the drive wheels. It is also known that if part of the weight of the implement can be transferred to the tractor, the required increased loading on the drive wheels of the tractor can be obtained without increasing the weight of the tractor itself as by the addition of wheel weights.

In tractor implement assemblies wherein the implement is connected to the tractor by a linkage of the three-point type, the usual hydraulic power lift acting on the linkage can be controlled so that a lifting force less than that required to raise the implement from its working position can be exerted, whereby part of the weight of the implement is transferred to the tractor for increasing the loading on the tractor drive wheels. Load transfer in this manner enables the available power of a tractor to be fully utilised so that a heavy and relatively expensive construction of tractor is unnecessary.

Systems involving control of the pressure in the hydraulic lift system by by-passing the hydraulic fluid at relatively high pressure through a relief valve are limited to operating pressures which will not involve undue overheating of the fluid due to the fluid being continuously forced through the restriction provided by the relief valve, and it has been found that, for this reason, control by a relief valve adjusted according to variations in draft load, e.g. in response to movements of a draft-responsive member, is generally unsuitable for automatic depth or draft control of implements carried by a three-point linkage, and wherein the implement is supported at a selected working depth solely by applying an appropriate pressure in the hydraulic lift system.

Systems embodying a high pressure relief valve therefore are primarily applicable for effecting load transfer in tractor implement assemblies wherein the implement is supported at a desired working depth by means other than the hydraulic lift system, e.g. a depth-regulating wheel or skid, although they may be applied for depth or draft control when used with light implements, or implements of suitably limited draft, or wherein part of the load applied by the implement on the hydraulic lift is counter-balanced by other means so that the operating pressure is suitably limited.

It has before been proposed to provide a load transfer arrangement of the above character in which optional load transfer is obtainable by bringing into action, by manually operable means, a pre-set relief valve so that hydraulic fluid normally by-passed at low pressure is caused to build up a predetermined pressure in the hydraulic system less than that required to lift the implement from its working position.

In the co-pending application, Serial No. 722,001, filed March 17, 1958, a relief valve adjusted in response to changes in load on the draft-responsive member is used in a similar manner to obtain load transfer of varying degree, depending on the draft load conditions, while, according to the co-pending application Serial No. 649,454, filed March 29, 1957, load transfer is obtained by means of a variably loaded relief valve incorporated in a telescopic top link of the three-point linkage so as to be controlled by variations in draft load.

In tractors having implement-attaching means of the three-point linkage type and a hydraulic power lift controlled by a draft-responsive member so that under working conditions part of the weight of the implement is transferred to the driving wheels of the tractor, it is usual to provide an overload release actuated by the draft-responsive member so that, on occurrence of overload if the implement encounters an obstruction, pressure is released from the ram unit of the power lift so that implement weight is no longer transferred to the driving wheels of the tractor, thus reducing the grip of the tractor wheels to an extent which is generally sufficient to relieve the tractive effort which otherwise might cause damage to the tractor transmission and/or implement, or stall the tractor engine. Under some conditions, however, wheel slip may not occur, or may be insufficient to relieve the excess load. Furthermore, the tractor may have a tendency to rebound, particularly in the case of a tree root having some degree of resilience, in which case there may be a temporary or repeated application of load transfer and consequent application of undesirable stresses.

Automatic disengagement of the tractor clutch, if the implement encounters an obstruction, on the other hand, definitely relieves the tractor transmission, implement and attaching linkage of excessive strains, inasmuch as drive to the rear wheels of the tractor is disengaged completely on the occurrence of overload.

Various forms of automatic clutch-disengaging means have before been proposed. In one form a telescopic link embodying a hydraulic piston and cylinder is used in place of the ordinary top link of the three-point linkage, and a hydraulic clutch-disengaging device is operated by transmission of fluid under pressure from the cylinder in the telescopic link on the occurrence of overload.

In other proposals a clutch-disengaging device is operated mechanically by or under the control of the movable draft-responsive member.

The present invention has for its primary object to provide an improved, simple and effective combination of load transfer arrangement and automatic clutch-disengaging means.

According to the present invention, there is provided, in a tractor of the kind referred to, the combination of a load transfer arrangement, including a relief valve operable to cause build-up in the hydraulic power lift system of a predetermined or variable pressure less than that required to lift an implement carried by the implement-attaching means from its working position, and automatic clutch-disengaging means operable in response to a condition arising in the implement-attaching and control means on occurrence of excessive draft load. The load transfer arrangement may comprise a pre-set relief valve and manual control means whereby the pre-set relief valve may be brought into action to cause build-up of pressure in the hydraulic power lift system to provide when required, a predetermined degree of load transfer. Alternatively, the load transfer arrangement may comprise a relief valve adjusted in response to changes in load on the draft-responsive member. Manually operable means may be provided for adjusting the relation between setting of the relief valve and movement of the draft-responsive member. The load transfer arrangement may be constructed and arranged according to the co-pending application, Serial No. 722,001, filed March 17, 1958.

The automatic clutch-disengaging means may be of any suitable construction, but preferably is constructed and arranged according to the co-pending application, Serial No. 722,020 filed March 17, 1958, now abandoned, so that the hydraulic clutch-disengaging device is operated by fluid under pressure derived from the hydraulic power lift system.

The invention is hereinafter described, by way of example, with reference to the diagrammatic drawing accompanying the provisional specification, in which:

FIG. 1 is a sectional elevation illustrating the combination of hydraulic clutch-disengaging means and load transfer arrangement.

FIG. 2 is a sectional plan view corresponding to FIG. 1; and

FIG. 3 is a detail section on the line III—III, FIG. 1.

In carrying the invention into effect according to one embodiment, the load transfer arrangement comprises a unit or assemblage adapted for mounting on a tractor and integrally or otherwise associated with the ram cylinder of the power lift. Hydraulic fluid delivered from a pump P through conduit 1a enters the control means at 1 (FIG. 2) and flows into a passage 2 communicating with a bore or chamber 3. A selector valve 6 of the piston type is slidable in the bore 3 to control flow of fluid between various passages. The valve 6 has a stem 6a which is attached to a manually operated bell crank lever 6b pivotally attached to the tractor rear housing (not shown) at 6c, said lever 6b being positioned on the arcuate detent member or quadrant 6d which is also affixed to the tractor rear housing. A passage 4 communicates between the bore 3 and a by-pass return passage 5 communicating with a reservoir S by way of conduit 5a, and conduit 5b communicates the reservoir with the pump. A passage 7 extends from the bore 3 and communicates through a vertical bore 7a and passage 10 with the ram cylinder 9 of the power lift. A passage 8 intermediate the passages 4 and 7 leads from the bore 3 to a relief valve 11, and a passage 12 extends from the bore 3 and communicates with the passage 5 under the control of an auxiliary piston valve 13. The inlet passage 2 also communicates by passage 2a with the bore 3 at a position opposite the passage 4 through a pre-set relief valve 14 serving to restrict the maximum pressure in the system.

The relief valve 11 is pressed against its seating by a spring 15, the loading of which is variable by means of a slidable member 16 connected by a toggle linkage 17, 18 to a draft-responsive member 19 to which the top link of a three-point linkage is connected, the member 19 being movable, under the influence of changes in compressive load on the top link, against the action of a spring 20. The toggle linkage is adjustable by a manual control bell crank lever 21 pivotally connected to the tractor rear housing (not shown) pivoted at 22 and slidable over an arcuate detent member or quadrant 22' also attached to the tractor rear housing and connected to the common pivot 23 of the toggle links 17, 18 through a link 22a so that the effective length of the connection between the member 16 and the member 19 may be varied to adjust the relation between loading on the spring 15 and the position of the draft-responsive member 19.

The ram piston 24 operating in the ram cylinder 9 acts through a push-rod 25 on an arm 26 on a cross-shaft or rock shaft 27 provided with lift arms 28 which are connected by lift links (not shown) to the lower links of a three-point implement-attaching linkage.

The auxiliary piston valve 13 is connected through toggle links 29, 30 with a drop arm 31 on the cross-shaft 27 and this toggle linkage is adjustable by means of a manual control lever 29a connected to the common pivot of the links 29, 30 so that the effective length of the connection between the auxiliary piston valve 13 and the arm 31 may be varied.

Application of load transfer is accomplished by positioning the piston valve 6 as shown in FIG. 2 so that the reduced portion of the valve places the passages 2, 7 and 8 in communication with one another. As the fluid delivered under pressure to the passage 2 can now only flow to the by-pass return passage 5 through the relief valve 11, the pressure applied in the ram cylinder 9 is governed by the loading applied through the spring 15 to the relief valve 11. As before described, the loading on the relief valve 11 is adjustable by operation of the control lever 21. When used with implements of considerable draft supported at a predetermined working depth by a depth control wheel or skid, the arrangement is such that the maximum loading on the relief valve is restricted to exert a maximum pressure in the ram cylinder 9 less than that required to lift the implement from working position.

Variable loading of the relief valve 11 in the manner described in response to movement of the draft-responsive member 19 serves to adjust the pressure in the ram cylinder 9 to provide a measure of compensation for fluctuations introduced by fore and aft pitching of the tractor in relation to the implement due to irregularities of ground level. If the tractor pitches forwardly there will be a tendency to lift the implement from its working position, particularly if maximum load transfer is being employed. However, on forward pitching movement of the tractor, any reduction or reversal in load on the draft responsive member 19 reduces the loading on the relief valve 11 and consequently the pressure in the ram cylinder 9, thereby reducing the lifting action on the implement. Rearward pitching of the tractor and consequent upward movement of the lift arms 28 in relation to the tractor tends momentarily to relieve the tractor of the normal transferred load, but the increased compressive load exerted on the draft-responsive member 19 acts to increase the loading on the relief valve 11 and consequently the pressure in the ram cylinder 9 so as to increase lift and consequent load transfer and avoid the possibility of intermittent wheel slip.

In practice, the maximum loading on the relief valve 11 is determined by the necessity of limiting the operating pressure so that continuous by-passing of fluid through the relief valve will not involve undue over-heating of the fluid, and the arrangement described is therefore primarily applicable for obtaining load transfer when used with wheel or skid-supported implements.

When using an implement of little or no draft, it may be necessary to limit the amount of its fall towards the ground to a definite distance. In such cases, load transfer is not required and an alternative depth-limiting control is brought into action by displacing the selector valve 6 from the position shown in FIG. 2 against the action of the spring 32 to a position in which the passages 7 and 12 are placed in communication. Hydraulic fluid then flows from the cylinder 9 through the passages 10, 7a, 7, bore 3 and passage 12 to the return passage 5, thus allowing the lift arms 28 to fall. At the same time, the movement of the arm 31 on the cross-shaft 27 acting through the toggle links 29, 30 causes the auxiliary piston valve 13 to move to the right and shuts off communication between the passages 12 and 5, so that falling movement of the implement is arrested at a point determined by the setting of the control lever coacting with the toggle links 29, 30 to vary the effective length of the connection between the valve 13 and the arm 31.

A clutch-withdrawal lever 33 pivoted at 34 is actuated by a hydraulic clutch-disengaging device 35 embodying a hydraulic plunger 36 acting on an arm 37 of the lever 33 through an adjusting element 38. The plunger or detonator 36 is slidable in a cylinder 39 and is accessible to hydraulic pressure in a cavity or space 40 between the plunger 36 and a cap member 41 to which a conduit 42 is connected. A spring 43 is connected to the lever 33. The conduit 42 communicates through a fitting 44 with a passage 45 communicating with a bore 46 in which a piston control valve 47 is slidable. A passage 48 (FIGS. 2 and 3) communicates between the bore 46 and the ram cylinder 9 of the power lift. The piston valve 47 is connected by a rod 49 to the draft-responsive member 19.

When an implement carried by the linkage meets an obstruction, such as a tree root, the sudden overload compresses the spring 20 to such an extent that the valve 47 is displaced sufficiently to place the passages 45 and 48 in communication with one another. Hydraulic fluid under pressure then flows from the ram cylinder 9 through the passages 10, 48 and 45 and the conduit 42 to the cavity 40 of the hydraulic clutch-disengaging device 35, with the result that the plunger 36 is forced against the arm 37 of the clutch-withdrawal lever 33 and causes the lever to rotate about the pivot 34 to effect disengagement of the clutch 43a. In order to re-set the device, the clutch 43a is held disengaged by the normal foot pedal, reverse gear is engaged, and hydraulic pressure in the device 35 is released by operation of the selector valve 6 to allow hydraulic fluid to flow back from the ram cylinder 9 to a reservoir, the plunger 36 being retracted by the action of the spring 43 so that when pressure on the clutch pedal is released in the normal manner, the tractor will be reversed to enable the obstruction to be cleared. It will be understood that so long as the passage 45 is in communication with the passage 48 and there is pressure of fluid in the ram cylinder 9, the clutch will be held disengaged by the action of the device 35. Even if, by rebound action of the tractor, the valve 47 shuts off communication between the passages 45 and 48 after the clutch-disengaging device 35 has operated, the clutch will be maintained in the disengaged position by the fluid under pressure which then cannot return through the passage 45. In view of this possibility, it may be necessary or desirable to provide for the passage 45 to be placed in communication with the reservoir, either by operation of the selector valve 6 or by an additional manually-operated valve. The passage 48 may be arranged to communicate with any point in a hydraulic system of the tractor where hydraulic fluid under sustained pressure is available.

The automatic clutch-disengaging means may be combined with a conventional overload pressure release, such as used in hydraulic lift systems embodying automatic load transfer or depth or draft control. For example, movement of the draft-responsive member to operate the overload pressure release could at the same time connect the passages 45 and 48 so that fluid under pressure from the ram cylinder can operate to disengage the clutch before pressure release occurs, and means such as a non-return valve would be provided to prevent return flow of fluid from the clutch-operating means and thereby prevent re-engagement of the clutch until the trapped fluid is released by manually operable means.

The load transfer arrangement may be of the known kind in which optional load transfer is obtained by bringing into action by manual control a pre-set relief valve causing a build-up of pressure in the ram cylinder to an extent less than that required to lift the implement from working position. Furthermore, the automatic cluch-disengaging means may be operated hydraulically or mechanically or in any other suitable manner in response to movement of a draft-responsive member on occurrence of excess load.

The invention is generally applicable to implement-attaching means of the three-point or two-point type, wherein a hydraulic power lift system is operable to provide load transfer, and the implement-attaching means embodies a draft-responsive member whereby the automatic clutch-disengaging means may be operated on occurrence of excess load.

I claim:

1. In a tractor having a transmission including clutch means and an implement hitch means adapted to carry an implement and including a draft responsive member resiliently loaded so as to be movable in response to changes in draft load, a hydraulic power lift means including a ram cylinder and associated ram piston and a pump delivering fluid under pressure and a reservoir as a source of fluid, a hydraulic power lift control means having a chamber communicating the pump and the reservoir, a relief valve means operatively connected with said draft responsive member and communicating with the chamber and the reservoir, means disposed within the chamber controlling the flow of fluid under pressure and operable to direct fluid under pressure from the pump and the cylinder to the reservoir for lowering the implement, to direct the fluid under pressure from the pump and cylinder through the relief valve to the reservoir for adjusting the position of the implement consequent upon draft forces exerted upon said draft responsive means, to direct fluid under pressure from the pump to the cylinder for raising the implement, and to direct fluid under pressure from the pump to the reservoir for transport of the implement while the relief valve remains closed, and automatic clutch-disengaging means operatively connected with the draft responsive member and operable in response to an increase in pressure in the ram cylinder upon occurrence of excessive draft load to disengage said clutch means concomitant with actuation of said disengaging means by the member.

2. The invention according to claim 1 and said clutch disengaging means comprising valve means connecting with said draft responsive member, a pressure responsive detonator communicating with said valve means, and clutch releasing linkage operatively associated with said pressure responsive detonator, whereupon under excessive increase in draft load said valve means allows fluid communication between said cylinder and said pressure responsive detonator to actuate said releasing linkage.

3. In a tractor having a transmission including clutch means and said tractor comprising an implement hitch means having a draft responsive member and hydraulic operating means having connection with the member and operative therewith, said operating means including implement load receiving ram means and excessive draft responsive means connected to the ram means, said excessive draft responsive means being connected with the clutch means and operated by the member for receiving fluid pressure from the ram means to disengage the clutch means.

4. The invention according to claim 3 and further characterized in that said draft responsive means comprises a chamber and piston reciprocal therein and clutch releasing linkage between said piston and said clutch means.

5. The invention according to claim 4 and said draft responsive means further comprising valve means responsive to implement loads for selectively opening and closing fluid communication between the ram means and said chamber.

6. In a tractor having a traction means and clutch means for establishing and interrupting the tractive effort and implement hitch means including a draft responsive member, load transfer means operative between the hitch means and the tractor for varying the traction loading on the traction means in response to draft loads imposed on said hitch means, ram means operative of said hitch means, means being connected with and operative upon said clutch means and being in communication with said ram means, valve means for controlling said communication, and coupling means between the draft responsive member and said load transfer means and said valve means conjunctively operable by said draft responsive member for shifting draft loads to said traction means to a certain limit and then selectively opening said communication upon the transcending said limit.

7. The invention according to claim 6 and said load transfer means communicating with said ram means and responsive to load pressures transmitted by said draft responsive member.

References Cited in the file of this patent

UNITED STATES PATENTS

| | | |
|---|---|---|
| 2,394,210 | Sherman | Feb. 5, 1946 |
| 2,521,503 | Clark | Sept. 5, 1950 |
| 2,750,862 | Garmager | June 19, 1956 |

FOREIGN PATENTS

| | | |
|---|---|---|
| 1,075,023 | France | Apr. 7, 1954 |
| 650,387 | Great Britain | Feb. 21, 1951 |
| 687,341 | Great Britain | Feb. 11, 1953 |
| 78,128 | Netherlands | June 15, 1955 |